United States Patent [19]

Devitt et al.

[11] Patent Number: 4,942,344
[45] Date of Patent: Jul. 17, 1990

[54] CONTROL SYSTEM FOR BRUSHLESS MOTORS

[75] Inventors: Francis E. Devitt; John P. Doran, both of Carrigaline; Kevin J. Gaughan, Rochestown Road, all of Ireland

[73] Assignee: Moog Ltd., Ringaskiddy, Ireland

[21] Appl. No.: 189,039

[22] Filed: May 2, 1988

[30] Foreign Application Priority Data

Apr. 30, 1987 [IE] Ireland .................................. 1115/87

[51] Int. Cl.$^5$ ............................................. H02P 6/02
[52] U.S. Cl. ...................... 318/254; 318/138; 318/721
[58] Field of Search ............... 318/138, 254, 439, 721, 318/722, 723, 599

[56] References Cited

U.S. PATENT DOCUMENTS

| | | | |
|---|---|---|---|
| 4,039,911 | 8/1977 | Tanikoshi | 318/254 |
| 4,051,420 | 9/1977 | Tanikoshi | 318/254 |
| 4,295,085 | 10/1981 | Lafuze | 318/722 X |
| 4,353,016 | 10/1982 | Born | 318/138 X |
| 4,454,458 | 6/1984 | Holland | 318/254 |
| 4,490,661 | 12/1984 | Brown et al. | 318/254 X |
| 4,538,096 | 8/1985 | Kern | 318/313 X |
| 4,608,527 | 8/1986 | Glennon et al. | 318/723 X |
| 4,651,068 | 3/1987 | Meshkat-Razavi | 318/254 |
| 4,672,274 | 6/1987 | Suganuma | 318/138 X |
| 4,712,050 | 12/1987 | Nagasawa et al. | 318/138 X |

Primary Examiner—Bentsu Ro
Attorney, Agent, or Firm—Fleit, Jacobson, Cohn, Price, Holman & Stern

[57] ABSTRACT

An apparatus and method for controlling the amounts of torque-angle shift in a brushless motor. Various motor parameters are continuously monitored to determine the amount of torque-angle shift to be implemented. In this way only the minimum necessary amount of torque-angle shift is implemented and accordingly, motor control and efficiency is considerably improved.

8 Claims, 3 Drawing Sheets

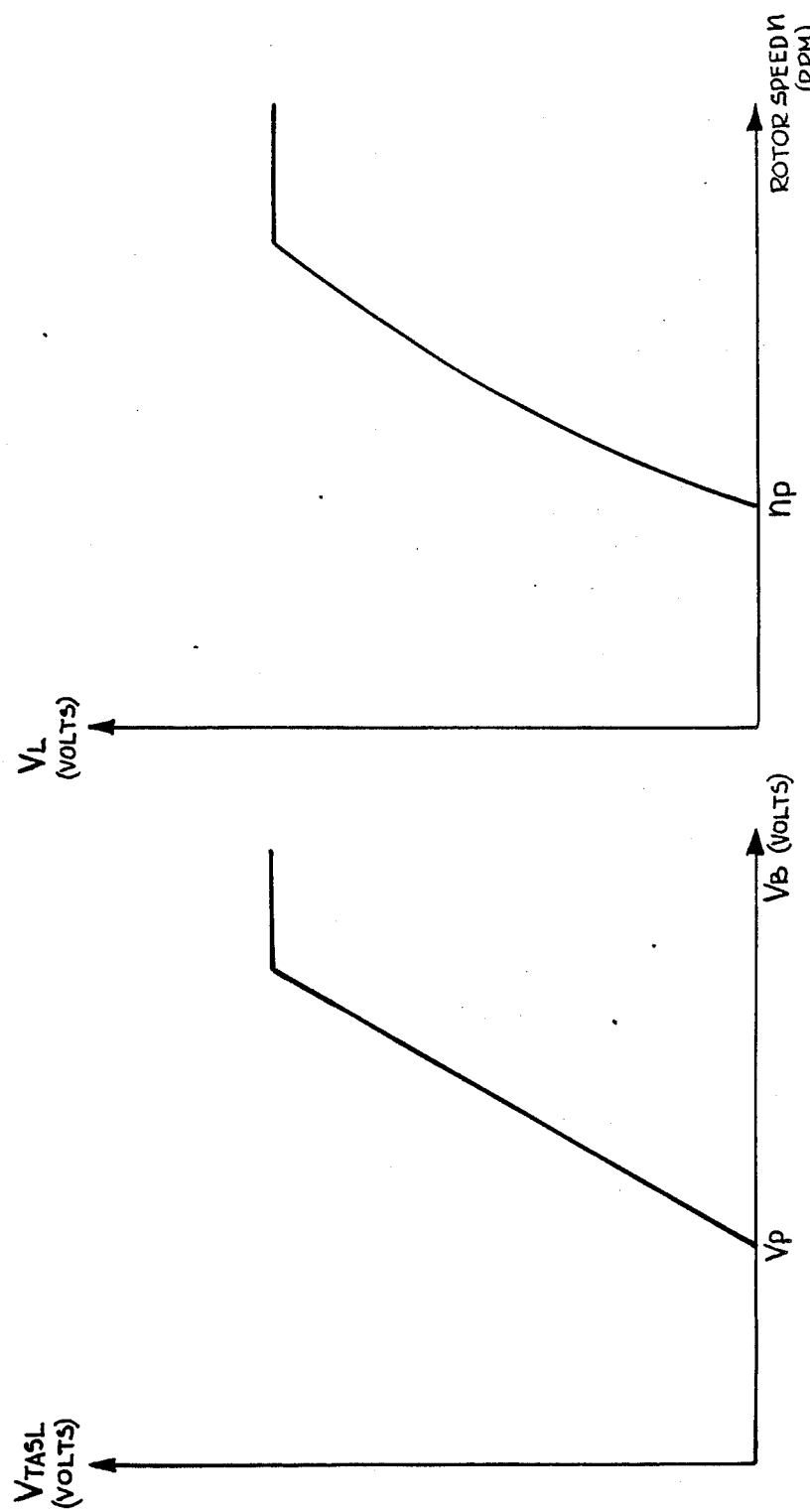

CONTROL SYSTEM FOR BRUSHLESS MOTORS

BACKGROUND OF THE INVENTION

1. Introduction

The present invention relates to the control of electrical motors, and in particular, doubly-excited electrical motors with electronic commutation.

2. Field of the Invention

Generally speaking, such motors have a rotating field which may consist of a winding in which currents flow to produce a magnetic field, or permanent magnets to produce a magnetic field with a fixed value. The armature, or load current-carrying part is typically stationary and the magnitude, waveshape and phasing of the armature currents are controlled by an electronic commutator or controller.

The performance of these motors is described by the following relationships:

$$T = c_1 \cdot K_T \cdot \cos\phi \cdot I$$

and, $$E = c_2 \cdot K_T \cdot n.$$

where
T = motor output torque;
$K_T$ = motor torque constant;
$c_1, c_2$ = numerical scaling factor depending scaling used for alternative definitions of $K_T$;
I = motor armature current;
E = motor generated voltage (back e.m.f.);
n = motor speed; and
$\phi$ = motor torque angle (defined below)

From first principles, it is well established that $K_T$ is a function of motor construction and magnetic field strength from the field part of the motor. If the angle between field and armature fluxes in the motor is called $\theta$ then $(90 - \theta)$ is referred to hereafter as the torque-angle, $\phi$.

For poly phase AC machines $\phi$ is also the angle between the fundamental harmonics of the armature current in a phase and phase-to-neutral generated voltage in that phase. This type of motor with permanent magnet field is commonly used in brushless servo systems. The electronic commutation in the motor controller controls the angle $\phi$.

Usually, in brushless motor controllers the electronic commutation constrains the angle $\phi$ to be 0°. This gives $\cos\phi$ it's maximum value and gives maximum output torque per unit of input current. However, as the speed of the motor increases, so also does the back e.m.f. until a limiting point is reached when the sum of the back e.m.f. and the motor impedance voltage drop caused by the load current equals the supply voltage. When this happens the motor speed cannot increase beyond this maximum level known as the "base speed". This base speed varies with load torque.

In principle, it is possible to achieve speeds higher than the base speed by dynamically varying $K_T$. This principle is known and it has been applied for wound field brush type DC motors by varying the field winding excitation current.

For brushless motors with permanent magnet excitation, varying $K_t$ by changing the field component magnetic field strength is not possible. However, it is possible to dynamically vary $\phi$, which is under electronic control.

If $\phi$ is increased from 0°, the current in a motor winding will lead the back e.m.f. in that winding. This causes the motor impedance voltage drop to have a component which is in Antiphase with the back e.m.f. Thus, the sum of the motor impedance voltage drop and the motor back e.m.f. can be smaller than the motor back e.m.f. This allows speeds greater than base speed to be achieved even though the speed dependent back e.m.f. may be several times larger than the maximum available supply voltage.

Below base speed, clockwise torque is obtained when the armature flux is 90° in a clockwise direction from the field flux whether the motor is turning clockwise (motoring) or counter-clockwise (generating). To obtain speeds higher than base speed the armature flux must be shifted further clockwise.

Below base speed, counter-clockwise torque is obtained when the armature flux is 90° in an counter-clockwise direction from the field flux whether the motor is turning clockwise or counter-clockwise. To obtain speeds higher than base speed the armature flux must be shifted further counter-clockwise. Thus, the required direction of torque angle shift depends only on the direction of motor torque, not on the direction of motor velocity.

It is important to have maximum decelerating (generating) torque so that the speed of an inertial load can be reduced quickly. To obtain maximum decelerating torque at high speed, torque angle shift must also be implemented and the required direction is set by the torque direction. Heretofore this has not been done, with the result that there is a speed lag in response to applied decelerating torque.

Torque-angle shifting has been implemented recently for brushless DC motors using electronic commutation. For example, U.S. Pat. No. 4,490,661 discloses that it can be achieved by applying sinusoidal excitation currents to the stator windings, the currents having values selected in accordance with pre-recorded digital sine values selected in accordance with the motor speed, motor load and rotor position. To achieve this, an electronic programming function is used, which function is established by making assumptions regarding certain motor parameter values, for example:- motor winding resistance, winding inductance, torque constant $K_T$ and the DC supply voltage. To make these assumptions, it is necessary to allow for the least favorable conditions of the parameters and of ambient conditions. Because of this, the torque-angle will often be shifted unnecessarily, or by more than is required, resulting in lower output torque and efficiency. During deceleration from high speeds, torque angle shift is implemented in the opposite direction for a long enough time to cause a lag in deceleration as the supply voltage is being fully utilized.

The present invention is directed towards solving these problems by providing an improved control method and apparatus for limiting the amount of torque-angle shift to the minimum necessary in brushless motors.

In this specification, the term "stator winding electrical supply" covers a current or voltage signal used to determine the fraction of supply voltage applied to the stator windings of a brushless motor or alternatively the actual current or voltage in the stator windings.

SUMMARY OF THE INVENTION

According to the invention there is provided a control apparatus for an electronically commutated motor, the control apparatus having means for control of torque-angle shift implementation, characterized in that the torque-angle shift control means comprises:

means for continuously monitoring a parameter value of the motor stator winding electrical supply;

means for continuously comparing the instantaneous parameter value of the stator winding electrical supply with the value of that parameter corresponding to full utilization of the motor's supply voltage; and means responsive to said comparison for continuously transmitting a signal to the torque-angle shift implementation means indicative of the amount of torque-angle shift to be implemented.

Ideally, the control means further comprises:

means for continuously monitoring motor torque direction; and means for changing the polarity of the torque-angle shift when motor torque direction changes.

The invention also provides a method of controlling torque-angle shift in an electronically commmutated motor comprising the steps of:

continuously monitoring a parameter value of the motor stator winding electrical supply; and continuously comparing the instantaneous parameter value of the stator winding electrical supply with a value of that parameter corresponding to full utilization of the motor supply voltage; and implementing torque-angle shift at a level determined by said comparison.

ADVANTAGES OF THE INVENTION

This is a significant improvement over known brushless motor controllers. By implementing torque-angle shift only when the motor supply voltage is being fully utilized, the control apparatus of the invention automatically and on-line shifts the torque-angle by the minimum amount necessary to achieve the instantaneous optimum level (magnitude and polarity) of torque-angle shift. By continuously monitoring stator winding electrical supply the control apparatus automatically compensates for variations in motor resistance, speed, load inductance, $K_T$ supply voltage, power transistor losses, and motor losses.

Another advantage is that torque-angle shift is always implemented in the correct direction. Accordingly, there is little speed lag in response to an applied decelerating torque and the speed of an inertial load may be quickly reduced. This is very important for servo systems.

The invention will be more clearly understood from the following description of a preferred embodiment thereof given by way of example only with reference to the accompanying drawings.

BRIEF DESCRIPTION OF THE DRAWINGS

FIGS. 2 and 3 are graphs illustrating process algorithms of portions of the control apparatus.

DETAILED DESCRIPTION OF THE INVENTION

Figure 1:
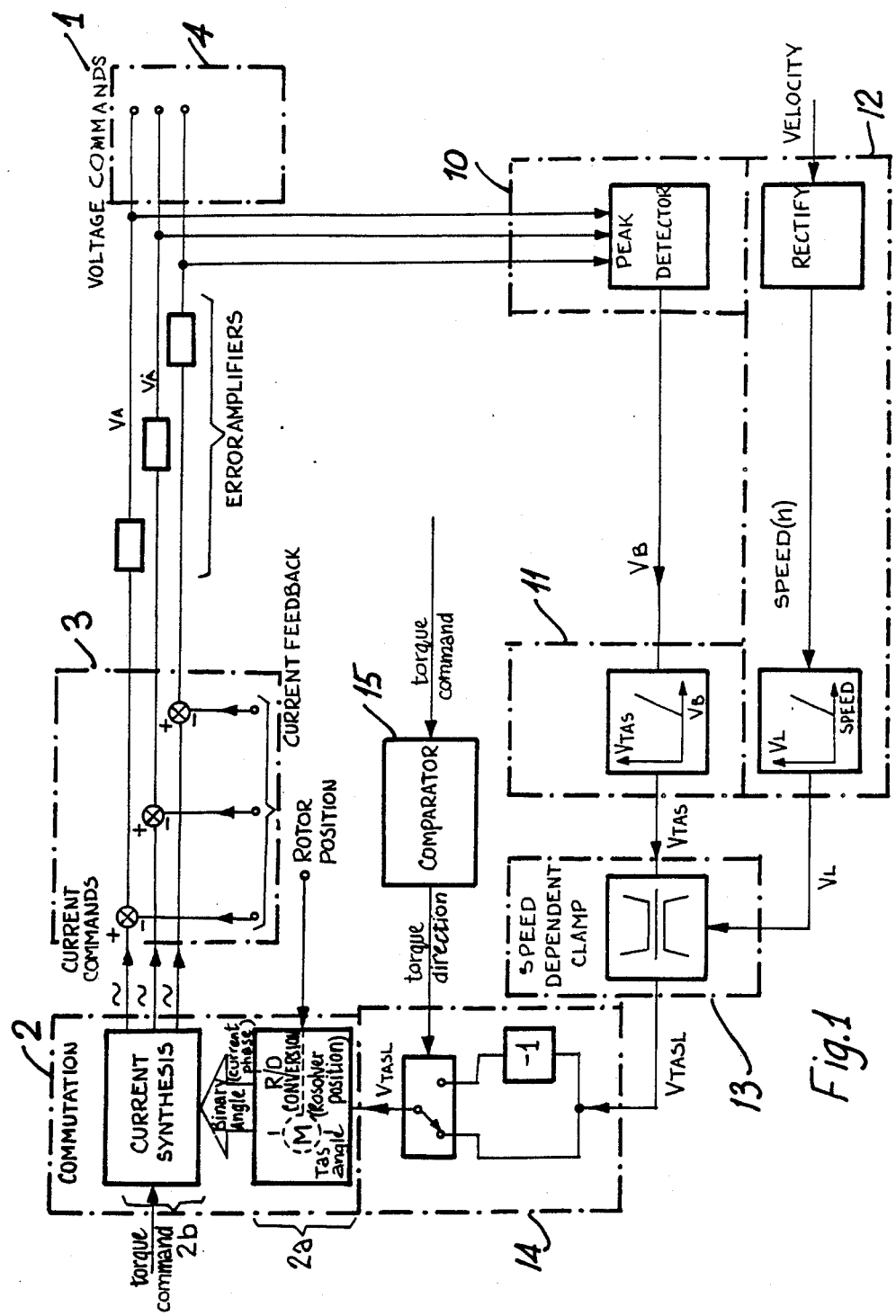
FIG. 1 is a block diagram of a control apparatus for a brushless motor.

Referring to the drawings, and initially to FIGS. 1 to 3 there is illustrated a control apparatus for a brushless motor, indicated generally by the reference numeral 1. In this case, the control apparatus 1 includes commutation circuits 2 for determining the current command signal for commutation of a brushless motor using a torque command supply. Current feedback from brushless motor stator windings is fed into error generator circuits 3 which also receive the current command signal. The resulting threephase voltage command signal ($V_A$) is then provided on output lines 4 for connection with a voltage amplifier driving brushless motor stator windings.

The control apparatus 1 further comprises a means for monitoring stator winding electrical supply, namely, peakdetector 10 connected to the output lines 4. The peakdetector 10 is connected to a spillover comparison circuit 11. The control apparatus 1 also includes protection means, namely, a motor speed dependent function generator 12 which is connected at its input to a resolver and associated circuitry (not shown) which continuously provide a signal indicative of motor velocity. The output of the speed dependent function generator 12 is used to provide a speed dependent clamp on the output of the spillover comparison circuit 11. The output of the speed dependent clamp 13 is connected to a polarity switch 14 which is controlled by torque direction which in this case is sensed by continuous monitoring by a comparator 15 of the torque command signal supplied to the commutation circuits 2. The polarity switch 14 is connected to the commutation circuits 2 which also receive a signal indicative of instantaneous rotor position from the aforesaid resolver.

In use, the output lines 4 are connected to a brushless motor voltage amplifier. The voltage amplifier is then fed with a voltage command signal $V_A$ to provide the stator winding electrical supply. When the motor is running, the voltage command signal $VA_A$ (which is representative of the stator winding electrical supply) is continuously monitored and its peak values are detected by the peakdetector 10. These peak values are outputted as a signal $V_B$, which signal is continuously monitored by the spillover comparison circuit 11. This latter circuit has a recorded value of $V_B$, namely $V_P$, which is the value of command voltage corresponding to full or almost full utilization of the supply voltage of the motor. When $V_B$ exceeds $V_P$ the spillover circuit 11 outputs a torque-angle shift voltage signal ($V_{TAS}$) according to the graph illustrated in FIG. 2. This latter signal indicates the amount of torque-angle shift required. Meanwhile, the speed dependent function generator 12 continuously receives an indication of motor speed (n). Depending on the motor speed, the function generator 12 outputs a torque-angle shift limiting signal ($V_L$) according to the graph of FIG. 3. This function is non-linear and is determined experimentally. Both $V_{TAS}$ and $V_L$ are inputted to the speed dependent clamp 13 which outputs a limited torque-angle shift voltage signal ($V_{TASL}$) which is essentially $V_{TAS}$ from the spillover comparison circuit 11 having been limited according to rotor speed. $V_{TASL}$ is illustrated in the graph of FIG. 2. It should be noted that the torque-angle shift signal $V_{TASL}$ is normally based on the instantaneous voltage command signal only, as the speed dependent clamp 13 limits $V_{TAS}$ only when torque-angle shift may transiently rise above an inherent stability limit.

The polarity switch 14 determines whether the torque-angle shift should be positive or negative dependent on the direction of torque in the motor. This torque-angle shift signal ($V_{TASL}$) is continuously fed to the commutation circuits 2.

In this embodiment, the commutation circuits 2 include resolver/digital conversion circuits 2a which output a digital angle signal dependent on rotor position and $V_{TASL}$. The signal is fed to a current synthesis circuit 2b.

It will be appreciated that by continuously monitoring torque direction and the voltage command signal, the control apparatus of the invention continuously and automatically compensates for variations in motor speed, load, resistance, inductance $K_T$, supply voltage, power transistor losses, and motor losses. Accordingly, for any motor output condition, only the necessary minimum torque-angle shift is implemented. It will be appreciated that in this way the optimum level of torque angle shift is provided during both generating and motoring conditions. By continuously monitoring motor torque direction, the required direction of torque-angle shift is always provided. This enables maximum decelerating torque to be obtained at high speed and virtually eliminates speed lag in response to applied decelerating torque.

It will be appreciated that by continuously monitoring motor speed, instability due to excessive implementation of torque-angle shift may be avoided. The speed dependent function generator 12, however, is not used to determine the level of torque-angle shift in most running conditions.

Figure 4:
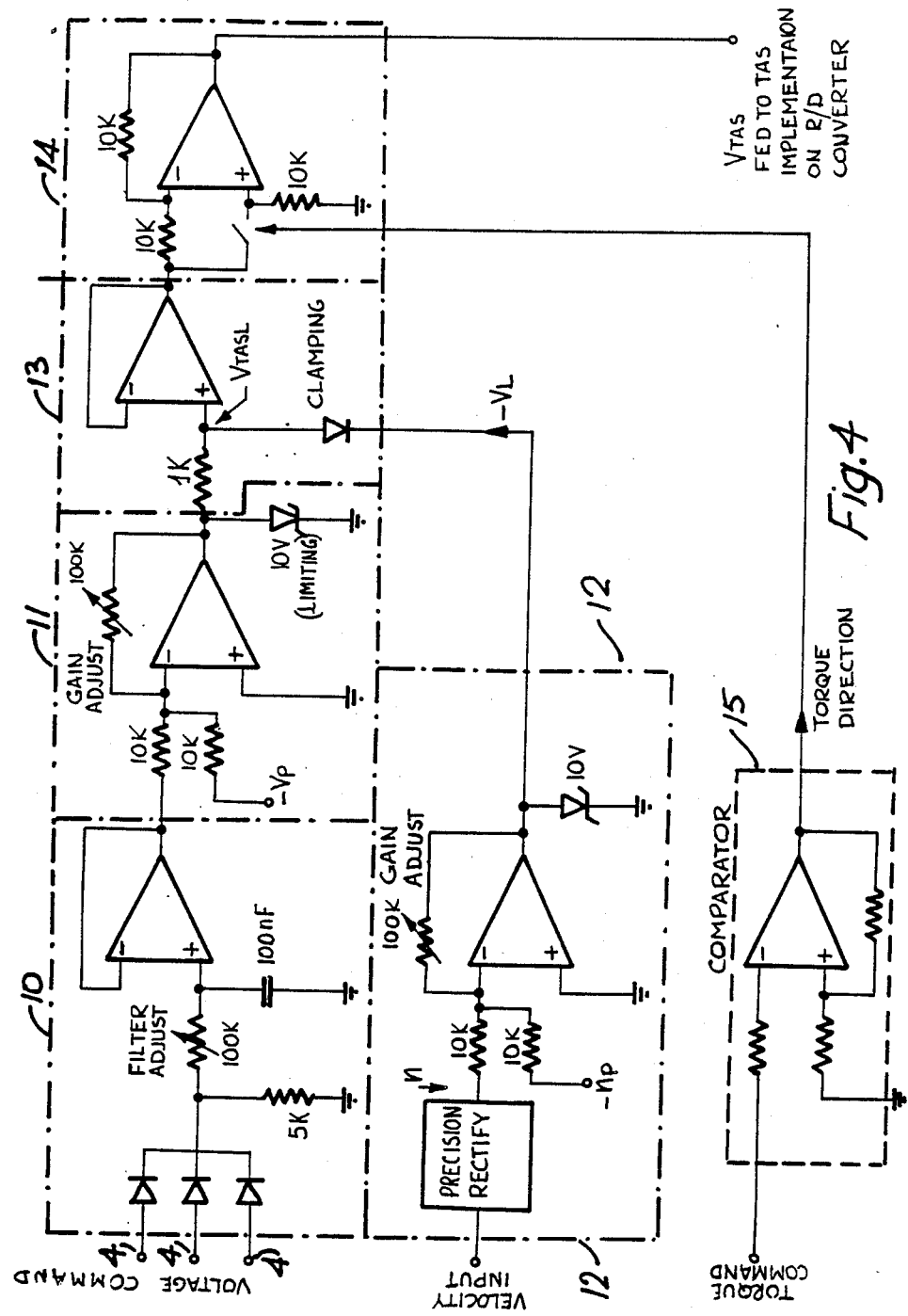
FIG. 4 is a circuit diagram illustrating the apparatus.

Referring now to FIG. 4, the circuit diagram for the control apparatus 1 is illustrated. The portions of the circuit corresponding to the various units of FIG. 1 are indicated by interrupted lines. The circuit will be readily easily understood by those skilled in the art. Although the control apparatus of the invention has been illustrated comprising brushless motor commutation circuits, these are not necessarily included. Further, the actual electrical supply in the stator windings may be monitored instead of the voltage command signal. The monitored parameter can be current or voltage. The control apparatus may comprise digital circuits instead of the analog circuits illustrated.

The invention is not limited to the embodiments hereinbefore described, but may be varied in both construction and detail.

We claim:

1. A control apparatus for controlling operation of a brushless motor having a stator, stator windings and a rotor, said control apparatus comprising:
   a voltage supply for the stator windings;
   means for indicating motor torque demand;
   means for indicating motor rotor position;
   monitoring means for continuously monitoring a voltage level of the stator windings;
   comparing means for continuously comparing said stator winding voltage level with a predetermined maximum value of stator winding voltage level corresponding to full utilization of said stator winding voltage supply;
   a commutation circuit for outputting a motor current demand signal in response to the indications of motor torque demand and rotor position, said commutation circuit having means for shifting a torque-angle of said current demand signal according to said comparison between said stator winding voltage level and said predetermined maximum value of stator winding voltage level corresponding to full utilization of the stator winding voltage supply; and
   a current feedback circuit for outputting a voltage command signal for the stator windings in response to said current demand signal and current feedback from the stator windings.

2. A control apparatus as recited in claim 1 wherein said apparatus further comprises
   means for continuously monitoring motor torque direction, and
   wherein the commutation circuit further comprises means for changing the polarity of said torque-angle shift when the monitored motor torque direction changes.

3. A control apparatus as recited in claim 2, wherein the torque direction monitoring means comprises means for continuously monitoring said indication of motor torque demand.

4. A control apparatus as recited in claim 1, further comprising means for continuously monitoring rotor speed, and wherein the commutation circuit further comprises protection means for setting a maximum level of torque-angle shift in response to said monitored rotor speed.

5. A control apparatus as recited in claim 1, wherein the monitoring means comprises means for monitoring said voltage command signal, and wherein said comparing means comprises means for comparing said voltage command signal level with a predetermined maximum value of voltage command signal level corresponding to full utilization of said stator winding voltage supply.

6. In combination with a brushless motor incorporating a stator, stator windings and a rotor, a control apparatus comprising:
   a voltage supply for the stator windings;
   means for indicating motor torque demand;
   means for indicating motor rotor position;
   monitoring means for continuously monitoring a voltage level of the stator windings;
   comparing means for continuously comparing said stator winding voltage level with a predetermined maximum value of stator winding voltage level corresponding to full utilization of said stator winding voltage supply;
   a commutation circuit for outputting a motor current demand signal in response to the indications of motor torque demand and rotor position, said commutation circuit having means for shifting a torque-angle of said motor current demand signal in response to said comparison between said stator winding voltage level and said maximum value of stator winding voltage level corresponding to full utilization of the stator winding voltage supply; and
   a current feedback circuit for outputting a voltage command signal for the stator windings in response to said motor current demand signal and current feedback from the stator windings.

7. A method of controlling torque-angle shift in a brushless motor having a stator, stator windings and a rotor, the method comprising the steps of:
   continuously monitoring a stator winding voltage command signal representing a voltage level of the stator windings;

continuously monitoring motor torque direction;
providing a predetermined maximum value of said stator winding voltage command signal corresponding to full utilization of a voltage supply for the stator windings;
continuously comparing said stator winding voltage command signal with said predetermined maximum value of stator winding voltage command signal;

controlling a shift of torque-angle of a current demand signal for said stator windings at an amount determined by said comparison; and
changing the polarity of said torque-angle shift of said current demand signal when the monitored torque direction changes.

8. A method as recited in claim 7, further comprising the steps of:
continuously monitoring rotor speed; and
setting a maximum level of torque-angle shift in response to the monitored rotor speed.

* * * * *